Nov. 21, 1950     H. K. GLEASMAN     2,530,764
COASTER BRAKE
Filed May 29, 1947
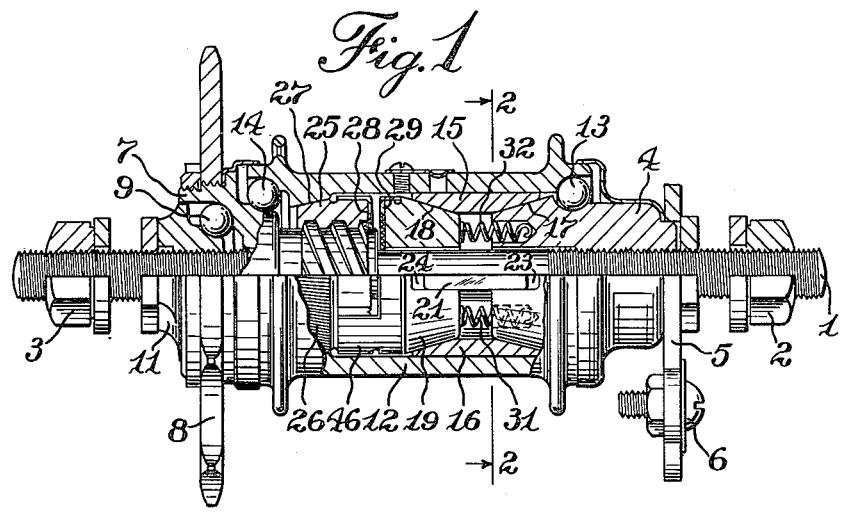
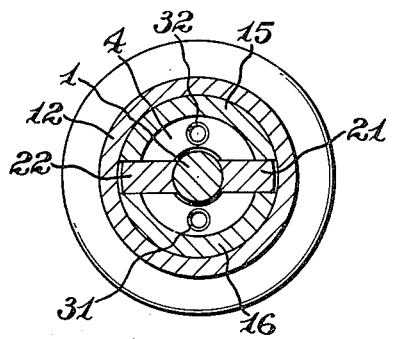
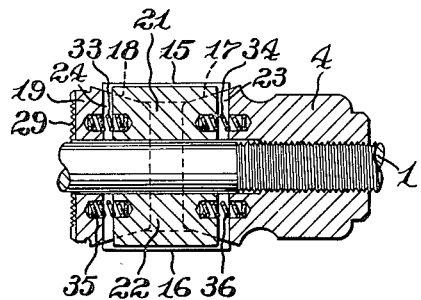
INVENTOR.
Hollis K. Gleasman
BY
Clinton S. James
ATTORNEY Patented Nov. 21, 1950

2,530,764

UNITED STATES PATENT OFFICE 2,530,764

COASTER BRAKE

Hollis K. Gleasman, Elmira, N. Y., assignor to Bendix Aviation Corporation, Elmira Heights, N. Y., a corporation of Delaware Application May 29, 1947, Serial No. 751,226

1 Claim. (Cl. 188—26)

The present invention relates to coaster brakes for velocipedes, and more particularly to improved operating means for such brakes.

In that type of coaster brake disclosed in the patent to Hood, 2,410,785, granted November 5, 1946, and assigned to the assignee of the present invention, the mechanical advantage of the brake applying means is limited by the fact that if the wedging angle of the expander members is made too low, it is possible that the brake may fail to release promptly when the operator removes the brake applying pressure from the expander member. In some types of installation, however, it is desirable to provide a high mechanical advantage in the brake applying mechanism in order that frequent and prolonged application of the brake may not become fatiguing to the operator.

It is an object of the present invention to provide a novel coaster brake of the above type which is so constituted that the brake applying means has a high mechanical advantage, while the possibility of the brake sticking or failing to release promptly is effectively prevented.

It is another object to provide such a device incorporating means for releasing the brake irrespective of the design and dimensions of the brake applying members.

It is another object to provide such a device in which the brake releasing means may perform the additional function of maintaining the brake anchoring members in their centralized, most effective position.

Further objects and advantages will be apparent from the following description taken in connection with the accompanying drawing, in which:

Fig. 1 is a side elevation partly broken away and in section of a preferred embodiment of the invention;

Fig. 2 is a section taken substantially on the line 2—2 of Fig. 1; and

Fig. 3 is a detail in longitudinal section of the brake member and expanding means, showing a modified form of brake releasing means.

In Fig. 1 of the drawing, there is illustrated a stationary axle 1 arranged to be clamped in the frame of a vehicle such as a bicycle by means of the clamp nuts 2 and 3 on the ends thereof. An anchor member 4 is mounted on the axle 1 adjacent one end thereof and prevented from rotation by a torque arm 5 non-rotatably connected thereto and having clamping means 6 for attachment to the frame of the bicycle so as to prevent rotation of the anchor member.

A driving and brake operating member 7, having a sprocket 8 fixed thereon, is journalled on the opposite end of the axle 1 by means of bearings 9 and cone 11, and a wheel hub 12 is journalled on the anchor member 4 and the brake actuating member 7 by means of bearings 13 and 14 respectively.

A cylindrical brake member is mounted in the wheel hub 12 for frictional engagement therewith under the control of the operator in order to retard the rotation of the wheel. As here shown, this brake member is formed of two semi-cylindrical parts 15, 16, the bore of which is flared outwardly at both ends in order to cooperate with the correspondingly tapered portion 17 of the anchor member 4, and a similarly tapered portion 18 of an expander member 19 slidably mounted on the axle 1. Rotation of the brake member and expander member 19 is prevented by rectangular keys 21 and 22 which are slidably received in corresponding axial recesses 23 and 24 in the anchor member and expander member respectively, and which extend between the sections 15, 16 of the brake member as best shown in Fig. 2.

Means for clutching the wheel hub 12 to the actuating member 7 is provided in the form of a nut 25 threaded on the actuating member 7 and having a conical clutch surface 26 arranged to engage a corresponding clutch surface 27 in the interior of the hub. The nut 25 is also arranged, upon backward rotation of the actuating member 7, to move the brake expander 19 to the right in order to apply the brake. For this purpose, the adjacent surfaces of the nut and expander member are provided with dentals 28 and 29 respectively which are arranged to mesh when the nut 25 is moved to the right by backward rotation of the actuating member 7. The nut 25 is thereby prevented from backward rotation so that further backward pressure on the actuating member 7 causes the expander member 19 to be moved to the right so as to cam the sections 15, 16 of the brake into frictional engagement with the interior of the hub.

In order to insure release of the brake when the backward pressure on the actuating member 7 is removed, one or more compression springs 31, 32 are located between the expander member 19 and anchor member 4 so as to exert axial pressure tending to separate these members. These springs may be located, as shown in Figs. 1 and 2, in recesses formed in one or both of the members 19, 4 whereby the springs are located and maintained in alignment so as to effectively perform their function. In some instances, it is desirable that these springs perform the additional function of maintaining the key members 21, 22 centralized between the anchor member 4 and expander member 19. This is accomplished in the manner shown in Fig. 3 in which the releasing springs are formed in pairs 33, 34 and 35, 36 seated in recesses in the ends of the key members 21, 22, and in corresponding recesses in the anchor member and expander member respectively. By this arrangement, the keys are maintained substantially centered between the anchor member and expander member.

In the operation of the device, forward rotation of the actuating member 7 causes the nut 25 to travel thereon to the left until it clutches and drives the hub 12. Backward rotation of the actuating member causes the nut to travel to the right, such travel being preferably insured by means of a frictional retarder 46 fixed to the expander member 19 and bearing frictionally on the periphery of the nut 25. Backward pressure on the actuating member after engagement of the dentals 28, 29 causes the expander member 19 to move to the right, thus forcing the sections 15, 16 of the brake member outwardly on the tapered surfaces 17, 18 of the anchor member and the expander member respectively, whereby the brake frictionally retards the rotation of the hub 12. The slope of the conical engaging surfaces of the brake and expander members is made quite gradual in order to secure a high mechanical advantage in the brake applying means. A moderate backward pressure on the actuating member 7 by the operator will therefore be adequate to apply the brake to its maximum desired effectiveness.

When the backward pressure on the actuating member 7 is relieved, the springs 31, 32 or 33, 34, 35, 36 become effective to separate the expander 19 from the anchor member 4, and press the expander back against the end of the actuating member 7. The brake is thereby released positively irrespective of the wedging angle of the tapered surfaces 17, 18, whereby effective control of the brake is maintained while permitting a high mechanical advantage of the brake applying means.

Although certain structure has been shown and described in detail, it will be understood that other embodiments are possible without departing from the spirit of the invention.

I claim:

In a coaster brake, an axle, an anchor member non-rotatably mounted thereon, a wheel hub journalled on the anchor member, a brake applying member slidably mounted on the axle, a brake member formed to frictionally connect the hub to the anchor member responsive to movement of the brake applying member toward the anchor member, means for moving the brake applying member toward the anchor member, said brake-applying member and anchor member having axially extending rectangular recesses, a rectangular key member slidably mounted at its ends in said recesses in the anchor member and the brake applying member respectively and forming a splined connection therebetween; and yielding means for separating the brake applying member from the anchor member when the moving means are released comprising a pair of compression springs located between the ends of the key and the anchor member and the brake applying member respectively and serving to maintain said key centralized with respect to said members.

HOLLIS K. GLEASMAN.

REFERENCES CITED

The following references are of record in the file of this patent:

UNITED STATES PATENTS

| Number | Name | Date |
|---|---|---|
| 1,018,471 | Zimmerman | Feb. 27, 1912 |
| 2,339,117 | Staples et al. | Jan. 11, 1944 |
| 2,410,785 | Hood | Nov. 5, 1946 |

FOREIGN PATENTS

| Number | Country | Date |
|---|---|---|
| 2,258 | Great Britain | Nov. 23, 1889 |